United States Patent
Cheng et al.

(10) Patent No.: US 10,198,283 B2
(45) Date of Patent: Feb. 5, 2019

(54) EXCLUSIVE ACCESS TO SHARED REGISTERS IN VIRTUALIZED SYSTEMS

(71) Applicants: ATI Technologies ULC, Markham (CA); Advanced Micro Devices (Shanghai) Co., LTD., Shanghai (CN)

(72) Inventors: Jeffrey G. Cheng, Markham (CA); Yinan Jiang, Markham (CA); Guangwen Yang, Markham (CA); Kelly Donald Clark Zytaruk, Markham (CA); LingFei Liu, Shanghai (CN); XiaoWei Wang, Shanghai (CN)

(73) Assignees: ATI Technologies ULC, Markham (CA); Advanced Micro Devices (Shanghai) Co., LTD., Shanghai (CN)

( * ) Notice: Subject to any disclaimer, the term of this patent is extended or adjusted under 35 U.S.C. 154(b) by 0 days.

(21) Appl. No.: 15/348,225

(22) Filed: Nov. 10, 2016

(65) Prior Publication Data

US 2018/0113731 A1  Apr. 26, 2018

(30) Foreign Application Priority Data

Oct. 21, 2016  (CN) .......................... 2016 1 0919623

(51) Int. Cl.
*G06F 9/455* (2018.01)
*G06T 1/20* (2006.01)

(52) U.S. Cl.
CPC ............ *G06F 9/45558* (2013.01); *G06T 1/20* (2013.01); *G06F 2009/4557* (2013.01); *G06F 2009/45575* (2013.01)

(58) Field of Classification Search
CPC .................................................. G06F 9/45558
See application file for complete search history.

(56) References Cited

U.S. PATENT DOCUMENTS

2013/0174144 A1* 7/2013 Cheng ................. G06F 9/45558
718/1
2013/0229421 A1* 9/2013 Cheng ...................... G06T 1/20
345/522

* cited by examiner

*Primary Examiner* — Sisley N Kim (57) ABSTRACT

A request is sent from a new virtual function (VF) to a physical function for requesting the initialization of the new VF. The controlling physical function and the new VF establish a two-way communication channel that to start and end the VF's exclusive accesses to registers in a configuration space. The physical function uses a timing control to monitor that exclusive register access by the new VF is completed within a predetermined time period. The new VF is only granted a predetermined time period of exclusive access to complete its initialization process. If the exclusive access period is timed out, the controlling physical function can terminate the VF to prevent GPU stalls.

17 Claims, 4 Drawing Sheets

EXCLUSIVE ACCESS TO SHARED REGISTERS IN VIRTUALIZED SYSTEMS

BACKGROUND

Description of the Related Art

Virtualization of computer resources allows the sharing of physical resources of a host system between different virtual machines (VMs), which are software abstractions of physical computing resources. The host system allocates a certain amount of its physical resources to each of the VMs so that each VM is able to use the allocated resources to execute applications, including operating systems (referred to as "guest operating systems"). Virtualization technology enables system administrators to shift physical resources into a virtual domain. For example, the physical host system can include physical devices (such as a graphics card, a memory storage device, or a network interface device) that, when virtualized, include a corresponding virtual function (VF) for each VM executing on the host system. As such, the VF's provide a conduit for sending and receiving data between the physical device and the virtual machines.

DETAILED DESCRIPTION

FIGS. 1-4 illustrate techniques for granting access to registers on input/output devices, such as GPUs, for initializing new virtual functions (VFs) and to prevent already initialized VFs from being diagnosed as hung, thereby avoiding unnecessary resets of the already initialized VFs. In some embodiments, a request is sent from a new VF to a physical function for requesting the initialization of the new VF. The controlling physical function and the new VF establish a two-way communication channel that uses an acquire-release protocol to start and end the VF's exclusive accesses to hardware registers in the GPU. The physical function uses a timing control to monitor the exclusive register access by the new VF and ensure that the exclusive access is completed within a predetermined time period. During the predetermined time period of exclusive access, the GPU register base address range is opened to allow VF to directly pass through (that is, access without an intervening driver or register manager) to the GPU registers. The incoming new VF is only granted a predetermined time period of exclusive access to complete its initialization process. If the exclusive access period is timed out, the controlling physical function has an option to terminate the VF so as to prevent prolonged GPU stalls. In some embodiments, after a new virtual function finishes initializing, a GPU scheduler triggers world switches between all already active VFs (e.g., previously initialized VFs) which have already finished initialization such that each VF is allocated GPU time to handle any accumulated commands. Allowing the previously initialized VFs to process accumulated commands and perform already scheduled computing tasks helps to prevent the VFs from being labeled as inactive or hung, thereby avoiding unnecessary resets of the VFs.

Figure 1:
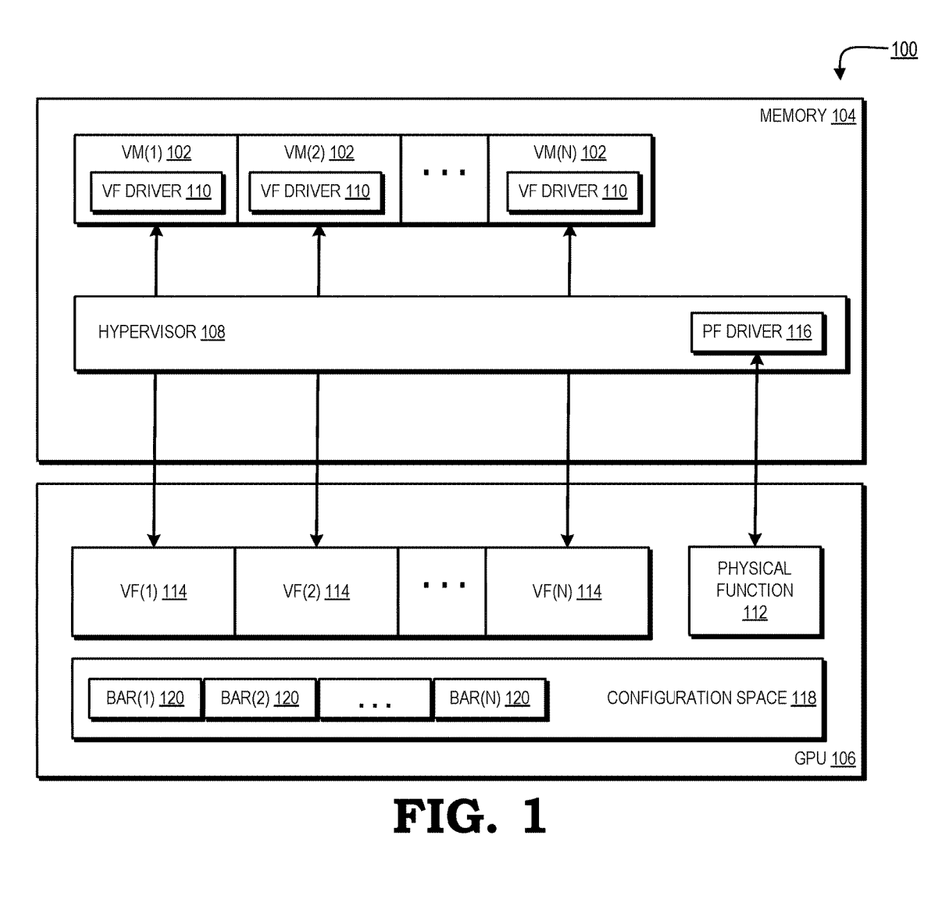
FIG. 1 is a block diagram of a system for hosting virtual machines and virtual functions in accordance with some embodiments.

FIG. 1 is a block diagram of a processing system 100 for hosting virtual machines and virtual functions in accordance with some embodiments. The system 100 comprises multiple virtual machines (VMs) 102 that are configured in memory 104 on a host system. Resources from physical devices of the host system are shared with the VMs 102. The resources can include, for example, a graphics processor resource from GPU 106, a central processing unit resource from a CPU, a memory resource from memory, a network interface resource from network interface controller, or the like. The VMs 102 use the resources for performing operations on various data (e.g., video data, image data, textual data, audio data, display data, peripheral device data, etc.). In one embodiment, the host system includes a plurality of resources, which are allocated and shared amongst the VMs 102.

The processing system 100 also includes a hypervisor 108 that is configured in memory 104 and manages instances of VMs 102. The hypervisor 108 is also known as a virtualization manager or virtual machine manager (VMM). The hypervisor 108 controls interactions between the VMs 102 and the various physical hardware devices, such as the GPU 106. The hypervisor 108 includes software components for managing hardware resources and software components for virtualizing or emulating physical devices to provide virtual devices, such as virtual disks, virtual processors, virtual network interfaces, or a virtual GPU as further described herein for each virtual machine 102. In one embodiment, each virtual machine 102 is an abstraction of a physical computer system and may include an operating system (OS), such as Microsoft Windows® and applications, which are referred to as the guest OS and guest applications, respectively, wherein the term "guest" indicates it is a software entity that resides within the VMs.

The VMs 102 are generally instanced, meaning that a separate instance is created for each of the VMs 102. Although two virtual machines (e.g., VM(1) and VM(2)) are shown, one of ordinary skill in the art will recognize that a host system may support any number N of virtual machines. As illustrated, the hypervisor 108 provides two virtual machines VM(1) and VM(2), with each of the guest virtual machines 102 providing a virtual environment wherein guest system software resides and operates. The guest system software comprises application software and VF device drivers 110, typically under the control of a guest OS.

In various virtualization environments, single-root input/output virtualization (SR-IOV) specifications allow for a single Peripheral Component Interconnect Express (PCIe) device (e.g., GPU 106) to appear as multiple separate PCIe devices. A physical PCIe device (such as GPU 106) having SR-IOV capabilities may be configured to appear as multiple functions. The term "function" as used herein refers to a device with access controlled by a PCIe bus. SR-IOV operates using the concepts of physical functions (PF) and virtual functions (VFs), where physical functions are full-featured functions associated with the PCIe device. A virtual function (VF) is a function on a PCIe device that supports SR-IOV. The VF is associated with the PF, and represents a virtualized instance of the PCIe device. Each VF has its own PCI configuration space. Further, each VF also shares one or more physical resources on the PCIe device with the PF and other VFs.

In the example embodiment of FIG. 1, SR-IOV specification enables the sharing of graphics processing unit 106 among the virtual machines 102. The GPU 106 is a PCIe device having a physical function 112. The virtual functions 114 are derived from the physical function 112 of the graphics processing unit 106, thereby mapping a single physical device (e.g., the graphics processing unit 106) to a plurality of virtual functions 114 that are shared with the guest virtual machines 102. In some embodiments, the hypervisor 108 maps (e.g., assigns) the virtual functions 114 to the guest virtual machines 102. In another embodiment, the hypervisor 108 delegates the assignment of virtual functions 114 to the PF driver 116 of the GPU 106. For example, VF(1) 114 is mapped to VM(1) 102, VF(2) 114 is mapped to VM(2) 102, and so forth. The virtual functions 114 appear to the OS of their respective virtual machines 102 in the same manner as a physical GPU would appear to an operating system, and thus, the virtual machines 102 use the virtual functions 114 as though they were a hardware device.

Driver support for the virtual functions 114 is provided using VF drivers 110 installed in the guest OS of the virtual machines 102. As used herein, a device driver is a computer program based component that configures a machine and acts as a translator between a physical device and the applications or operating systems that use the device. A device driver typically accepts generic high-level commands and breaks them into a series of low-level, device-specific commands as required by the device being driven. The VF drivers 110 perform the same role as a typical device driver except that it configures the host system to provide translation between the virtual functions 114 that provide hardware emulation and the guest OS/application software running on the VMs 102. Each VF driver 110 comprises a set of instructions for directly interacting with a corresponding VF 114 of the GPU 106.

In contrast, physical function 112 is contacted via PF driver 116, which is implemented at the hypervisor 108. The PF driver 116 manages functions for the GPU 106 and is responsible for configuring shared resources. The PF driver 116 contains all traditional driver functionalities to provide access to the resources of the GPU 106. Further, the PF driver 116 may also be called to perform operations that impact the entire GPU 106 device. Any device specific operations that globally affect all VMs 102 are only accepted from the PF driver 116. To ensure this exclusivity, the drivers in the VMs 102 (e.g., VF drivers 110) needs to communicate control operations to the PF driver 116. Generally, the VFs 114 only have the ability to send and receive data, and the ability to perform resets on themselves. Each individual VF 114 is able to only reset itself, and not the entire GPU 106. In another embodiment, the VFs 114 are not permitted to reset themselves. Instead, the PF 112 or PF driver 116 performs the VF reset on behalf of the VFs 114. Outside of the above-mentioned capabilities, the VF drivers 110 communicate with the PF driver 116 to perform its operations.

The GPU 106 also includes hardware registers, which store hardware configuration data for the GPU 106. Some of the hardware registers are accessed through the configuration space 118 and other registers are accessed from GPU hardware engines. A full set of hardware registers is accessible to the physical function 112. In contrast, VFs 114 each implement only a subset of PCIe configuration space registers. The hardware registers of the GPU 106 cannot be accessed directly by the VMs 102. Instead, VMs 102 access the configuration space 118 via VFs 114. In one embodiment, VF drivers 110 access the configuration space 118 through a standard Base Address Register (BAR) 120. The contents of the BAR 120 are replicated across each VF 114 as well as the physical function 112. Each VF 114 has a memory space that is used to map to the hardware registers in configuration space 118 of the GPU 106. The VF drivers 110 operate on the registers to enable its functionality and the VF 114 appears as an actual PCI device. The VF drivers 110 bypass the hypervisor 108, providing VMs 102 direct access to the VFs 114 of the GPU 106. VFs 114 at the GPU 106 receives I/O from VF drivers 110. Thus, each VF 114 acts as an independent, virtual port of GPU 106, and uses hardware registers to implement a limited subset of the configuration space 118.

In one embodiment, some of the hardware registers are instanced for each of the VFs 114 while some other hardware registers are shared by all of the VFs 114. Some of the hardware registers are shared among multiple VFs by using context save and restore to switch between and run each function. Therefore, exclusive access to the hardware registers in configuration space 118 is required for the initializing of new VFs. As used herein, "exclusive access" refers to the GPU registers being accessible by only one virtual function at a time during initialization of VFs 114. When a virtual function is being initialized, all other virtual functions are paused or otherwise put in a suspended state where the virtual functions and their associated virtual machines do not consume GPU 106 resources. When paused or suspended, the current state and context of the VF/VM are saved to a memory file. In some embodiments, exclusive access to the hardware registers allows a new virtual function to begin initialization by pausing other running functions. After creation, the VF is able to be directly assigned an I/O domain. The hypervisor 108 assigns a VF 114 to a VM 102 by mapping configuration space registers of the VFs 114 to the configuration space presented to the VM by the hypervisor. This capability enables the VF 114 to share the GPU 106 and to perform I/O operations without CPU and hypervisor software overhead.

Figure 2:
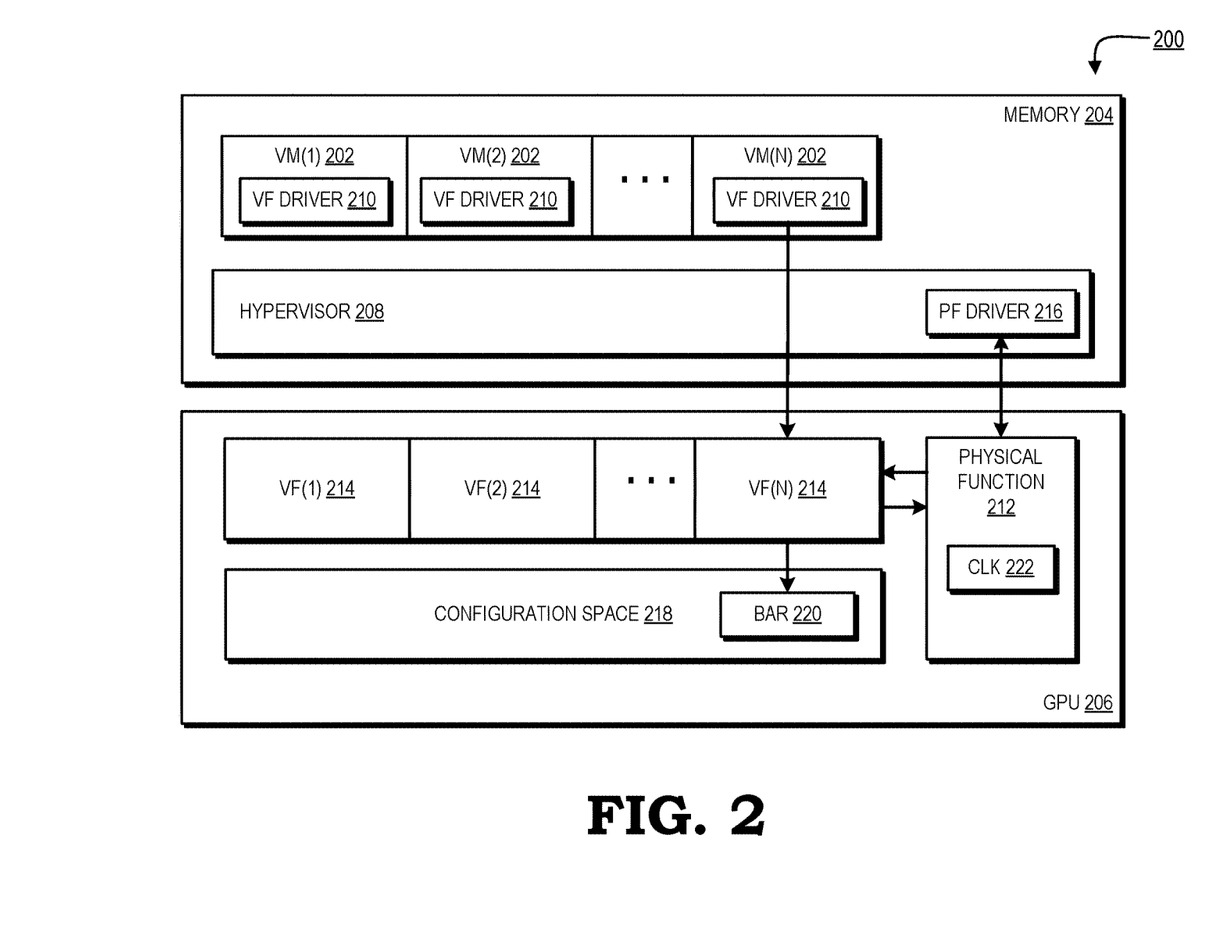
FIG. 2 is a block diagram illustrating an embodiment of a host system in accordance with some embodiments.

FIG. 2 is a diagram illustrating a processing system 200 for hosting virtual machines and virtual functions in accordance with some embodiments. The system 200 comprises multiple virtual machines (VMs) 202 that are configured in memory 204 on a host system. Resources from physical devices (e.g., GPU 206) of the host system are shared with the VMs 202. The processing system 200 also includes a hypervisor 208 that is configured in memory 204 and manages instances of VMs 202. The hypervisor 208 controls interactions between the VMs 202 and the various physical hardware devices, such as the GPU 206. Although two virtual machines (e.g., VM(1) and VM(2)) are shown, one of ordinary skill in the art will recognize that a host system may support any number N of virtual machines. As illustrated, the hypervisor 208 provides two virtual machines VM(1) and VM(2), with each of the guest VMs 202 providing a virtual environment wherein guest system software resides and operates. The guest system software comprises application software and VF device drivers 210, typically under the control of a guest OS running on the VMs 202.

The GPU 206 is a PCIe device having a physical function 212. The virtual functions 214 are derived from the physical function 212 of the graphics processing unit 206, thereby mapping a single physical device (e.g., the graphics processing unit 206) to a plurality of virtual functions 214 that is shared with the guest virtual machines 202. In some embodiments, the hypervisor 208 maps (e.g., assigns) the virtual functions 114 to the guest virtual machines 202. For example, VF(1) 214 is mapped to VM(1) 202, VF(2) 214 is mapped to VM(2) 202, and so forth. The virtual functions 214 appear to the OS of their respective virtual machines 202 in the same manner as a physical GPU would appear to an operating system, and thus, the virtual machines 202 use the virtual functions 214 as though they were a hardware device.

Driver support for the virtual functions 214 is provided using VF drivers 210 installed in the guest OS of the virtual machines 202. The VF drivers 210 perform the same role as a typical device driver except that it configures the host system to provide translation between the virtual functions 214 that provide hardware emulation and the guest OS application software running on the VMs 202. Each VF driver 210 comprises a set of instructions for directly interacting with a corresponding VF 214 of the GPU 206.

In contrast, physical function 212 is contacted via PF driver 216, which is implemented at the hypervisor 208 in some embodiments. In other embodiments, the PF driver 216 is implemented at a privileged host VM and is run by the hypervisor 208. The PF driver 216 manages functions for the GPU 206 and is responsible for configuring shared resources. The PF driver 216 contains all traditional driver functionalities to provide access to the resources of the GPU 206. Further, the PF driver 216 may also be called to perform operations that impact the entire GPU 206 device. Any device specific operations that globally affect all VMs 202 should only be accepted from the PF driver 216. To achieve this, it is necessary for the drivers in the VMs 202 (e.g., VF drivers 210) to communicate control operations to the PF driver 216. Generally, the VFs 214 only have the ability to send and receive data, and the ability to perform resets. The reset only affects each individual VF 214, and not the entire GPU 206. In another embodiment, the VFs 214 are not permitted to reset themselves. Instead, the PF 212 or PF driver 216 performs the VF reset on behalf of the VFs 214. For actions that are beyond the VF reset or sending and receiving data, the VF drivers 210 need to communicate with the PF driver 216.

The GPU 206 also includes hardware registers, which store hardware configuration data for the GPU 206. Some of the hardware registers are accessed through the configuration space 218 and other registers are accessed from the GPU hardware engines. A full set of PCIe configuration space registers is accessible to the physical function 212. In contrast, VFs 214 each implement only a subset of PCIe configuration space registers. The hardware registers of the GPU 206 cannot be accessed directly by the VMs 202. Instead, VMs 202 access the configuration space 218 via VFs 214. In one embodiment, VF drivers 210 access the configuration space 218 through a Base Address Register (BAR) 220. The contents of the BAR 220 are replicated across each VF 214 as well as the physical function 212. Each VF 214 has a memory space that is used to map to the hardware registers in configuration space 218 of the GPU 206. The VF drivers 210 operate on the registers to enable its functionality and the VF 214 appears as an actual PCI device. The VF drivers 210 bypass the hypervisor 208, providing VMs 202 direct access to the VFs 214 of the GPU 206. VFs 214 at the GPU 206 receives I/O from VF drivers 210. Thus, each VF 214 acts as an independent, virtual port of GPU 206, and uses hardware registers to implement a limited subset of the configuration space 218.

In one embodiment, some of the hardware registers are instanced for each of the VFs 214 while some other hardware registers are shared by all of the VFs 214. Some of the hardware registers are shared among multiple VFs by using context save and restore to switch between and run each function. Therefore, exclusive access to the hardware registers in configuration space 218 is required for the initializing of new VFs. In some embodiments, exclusive access to the hardware registers allows a new virtual function to begin initialization by pausing other running functions.

As shown in FIG. 2, the VF driver 210 of VM(N) 202 sends a request through VF(N) 214 to physical function 212 for requesting the initialization of a new virtual function (i.e., VF(N)). The controlling physical function 212 and VF(N) 214 establish a two-way communication channel that uses an acquire-release protocol to start and end VF(N)'s exclusive accesses to hardware registers in the GPU 206. The acquire-release protocol includes an acquire operation such that the controlling physical function 212 and VF(N) does not permit memory operations to be advanced before it. The acquire operation guarantees that only VF(N) 214 is able to update the registers. The acquire-release protocol further includes a release operation such that the controlling physical function 212 and VF(N) do not permit memory operations preceding the release to be delayed past it. Thus, the release operation guarantees that the registers have been updated before access is released for a different a different VF or the PF to use. In some embodiments, the acquire operation is a load that loads values associated with a VF/VM into the registers. Similarly, the release operations are a store that stores values in the registers to memory, leaving the registers available to be acquired. The physical function 212 uses a clock (CLK) 222 or other similar timing control to monitor that exclusive register access by VF(N) is completed within a predetermined time period. During the predetermined time period of exclusive access, the GPU register base address range is opened to allow VF(N) to direct pass through to the GPU registers.

During the exclusive access time period, permission for accessing the GPU register BAR 220 is implemented by the PF 212 suspending a VF that is currently running on the GPU 206 such that the GPU 206 is idle for allowing the initializing VF to perform its exclusive access. Exclusive access to the hardware registers allows a new virtual function to begin initialization during the pausing of other running functions. After creation, the VF is directly assigned an I/O domain. The hypervisor 208 assigns a VF 214 to a VM 202 by mapping configuration space registers of the VFs 214 to the configuration space presented to the VM by the hypervisor. In some embodiments, the physical function 212 operates as a security measure by ensuring that incoming requests from VMs 202 are well behaved. For example, if a new VF/VM starts to initialize without requesting permission, the physical function 212 or PF driver 216 disables GPU register access capabilities.

In some embodiments, the incoming new VF (e.g., VF(N)) is only granted the predetermined time period to complete its initialization process. If the exclusive access period is time out, the controlling physical function 212 has an option to terminate the VF such as to prevent prolonged GPU stalls. If CLK 222 times out, then the PF 212 or PF driver 216 terminates the exclusive access by resetting the VF, such as by issuing a function-level reset (FLR) command.

Figure 3:
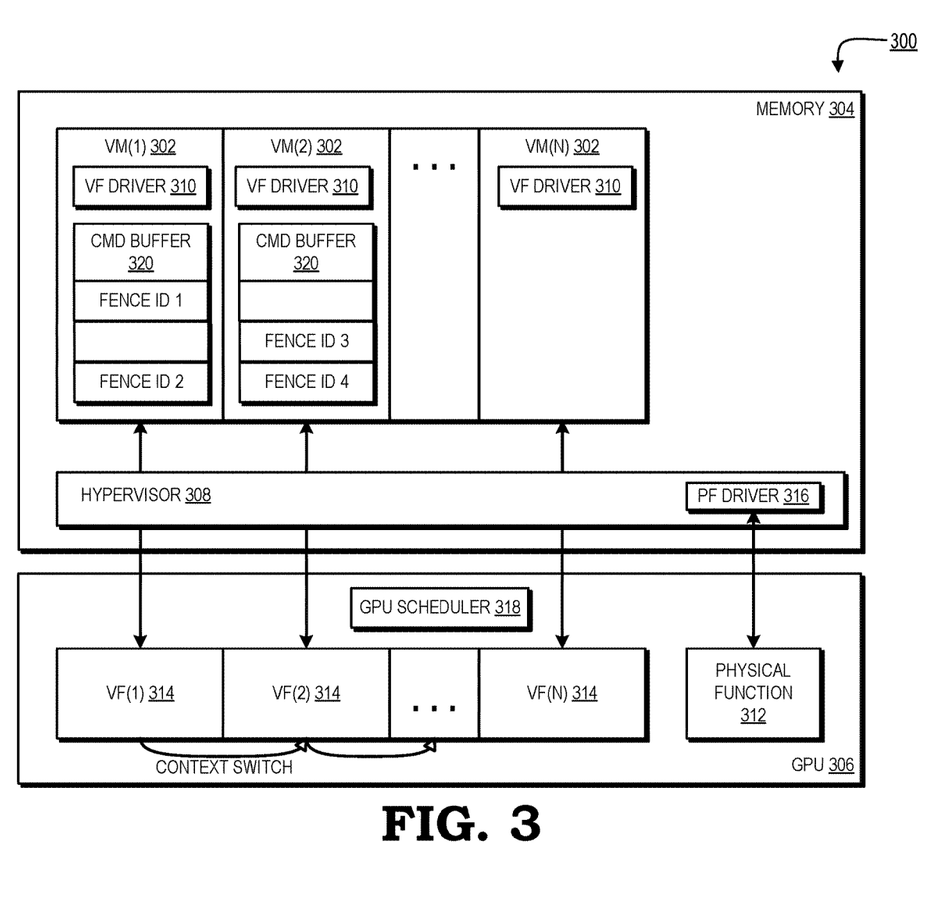
FIG. 3 is a diagram illustrating world switches between virtual functions in accordance with some embodiments.

FIG. 3 is a diagram illustrating world switches between virtual functions in accordance with some embodiments. FIG. 3 shows a hardware-based VM system 300 similar to those previously described in FIGS. 1-2. The system 300 includes a plurality of VMs 302 that are configured in memory 304 on a host system. Resources from physical devices (e.g., GPU 306) of the host system are shared with the VMs 302. The system 300 also includes a hypervisor 308 that is configured in memory 304 and manages instances of VMs 302. The hypervisor 308 controls interactions between the VMs 302 and the various physical hardware devices, such as the GPU 306. Although two virtual machines (e.g., VM(1) and VM(2)) are shown, one of ordinary skill in the art will recognize that a host system supports any number N of virtual machines. As illustrated, the hypervisor 308 provides two virtual machines VM(1) and VM(2), with each of the guest VMs 302 providing a virtual environment wherein guest system software resides and operates. The guest system software comprises application software and VF device drivers 310, typically under the control of a guest OS running on the VMs 302.

The GPU 306 is a PCIe device having a physical function 312. The virtual functions 314 are derived from the physical function 312 of the graphics processing unit 306, thereby mapping a single physical device (e.g., the graphics processing unit 306) to a plurality of virtual functions 314 that is shared with the guest virtual machines 302. In some embodiments, the hypervisor 308 maps (e.g., assigns) the virtual functions 314 to the guest virtual machines 302. In another embodiment, the hypervisor 308 delegates the assignment of virtual functions 314 to the PF driver 316 of the GPU 306. For example, VF(1) 314 is mapped to VM(1) 302, VF(2) 314 is mapped to VM(2) 302, and so forth. The virtual functions 314 appear to the OS of their respective virtual machines 302 in the same manner as a physical GPU would appear to an operating system, and thus, the virtual machines 302 use the virtual functions 314 as though they were a hardware device.

Driver support for the virtual functions 314 is provided using VF drivers 310 installed in the guest OS of the virtual machines 302. The VF drivers 310 perform the same role as a typical device driver except that it configures the host system to provide translation between the virtual functions 314 that provide hardware emulation and the guest OS/application software running on the VMs 302. Each VF driver 310 comprises a set of instructions for directly interacting with a corresponding VF 314 of the GPU 306.

In contrast, physical function 312 is contacted via PF driver 316, which is implemented at the hypervisor 308 in some embodiments. In other embodiments, the PF driver 316 is implemented at a privileged host VM and is run by the hypervisor 308. The PF driver 316 manages functions for the GPU 306 and is responsible for configuring shared resources. The PF driver 316 contains all traditional driver functionalities to provide access to the resources of the GPU 306. Further, the PF driver 316 is also able to be called to perform operations that impact the entire GPU 306 device. Any device specific operations that globally affect all VMs 302 should only be accepted from the PF driver 316. To achieve this, it is necessary for the drivers in the VMs 302 (e.g., VF drivers 310) to communicate control operations to the PF driver 316. Generally, the VFs 314 only have the ability to send and receive data, and the ability to perform resets. The reset only affects each individual VF 314, and not the entire GPU 306. In another embodiment, the VFs 314 are not permitted to reset themselves. Instead, the PF 312 or PF driver 316 performs the VF reset on behalf of the VFs 314. For actions that are beyond the VF reset or sending and receiving data, the VF drivers 310 need to communicate with the PF driver 316.

A GPU scheduler 318 is configured in the GPU 306 to manage the allocation of GPU resources to perform the operations of the virtual functions 314. In one embodiment, the GPU PF driver 316 manages and provisions GPU bandwidth of the GPU 306 by time-slicing between the VMs 302. In another embodiment, the GPU scheduler 318 manages and provisions GPU bandwidth. In SR-IOV virtualization as discussed herein, the VFs 314 get their time slices from the GPU scheduler 318. However, as discussed in relation to FIGS. 1-2, when a new VF (e.g., VF(N)) requests exclusive access to GPU registers for initialization, the other VF-VMs will not get any GPU time to handle any accumulated commands in their respective command buffers 320. Accordingly, the guest OS of the VMs 302 will prematurely consider the GPU as being hung when the GPU scheduler 318 detects that the GPU 306 is taking more than a permitted amount of time to execute particular tasks. The guest OS of the VMs 302 call into the VF drivers 310 to query the latest fence instructions before starting a timeout detection and recovery (TDR) cycle.

As illustrated in FIG. 3, a call from the guest OS of VM(1) 302 to return the latest completed fence instruction (e.g., using a querycurrentfence command) will return FENCE ID 1, which differs from the last submitted fence instruction FENCE ID 2. Similarly, a call from the guest OS of VM(2) 302 to return its latest completed fence instruction will return FENCE ID 3, which differs from the last submitted fence instruction FENCE ID 4. This signals that the VFs 314 have not completed executing commands within the command buffers 320 to reach the latest submitted fence instructions. However, this is not due to hanging of the GPU 306 but instead is due to the GPU scheduler 318 not allocating time slices to process the accumulated commands while initializing new virtual functions.

In one embodiment, when the system 300 is initializing new virtual functions and one or more of the already initialized VFs 314 have pending fence instructions where the identification (ID) of the last submitted fence does not match its last completed fence instruction, the VF drivers 310 will allocate additional time periods to see whether the accumulated commands within command buffers 320 will be executed after the new virtual functions have finished initializing. If the VFs are allocated GPU time slices and finishes executing accumulated commands such that the ID of the last submitted fence instruction matches its last completed fence instruction, then an unnecessary TDR cycle will have been avoided for that VF. However, if the additional time period is up and the ID of the last submitted fence instruction still does not match its last completed fence instruction, then the GPU 306 and/or VF 314 is considered to be hung. And the VF driver 310 will properly initiate a TDR cycle to reset the VF.

In some embodiments, the VFs 314 is improperly identified as being hung even with additional time periods allocated before TDR if the system 300 has more than one new VF to be initialized. The guest OS of VMs 302 will eventually trigger TDR cycles if the VF drivers 310 cannot process accumulated commands before allocated time periods run out. Unnecessary TDR cycles are avoided by giving the already initialized VFs GPU time to perform its computing tasks. For example, after a new virtual function finishes initializing, the GPU scheduler 318 triggers world switches between all already active VFs 314 which have already finished initialization such that each VF 314 are allocated GPU time to handle any accumulated commands before reporting the last completed fence instruction ID back to the guest OS. During the world switches, the hypervisor 308 uses PF configuration space registers to switch the GPU from one VF (e.g., VF(1)) to another (e.g., VF(2)).

Although the embodiments discussed herein have primarily been described in the context of GPUs, one of ordinary skill in the art will recognize that the principles described herein are generally applicable to any physical device of a computing system, without departing from the scope of this disclosure.

Figure 4:
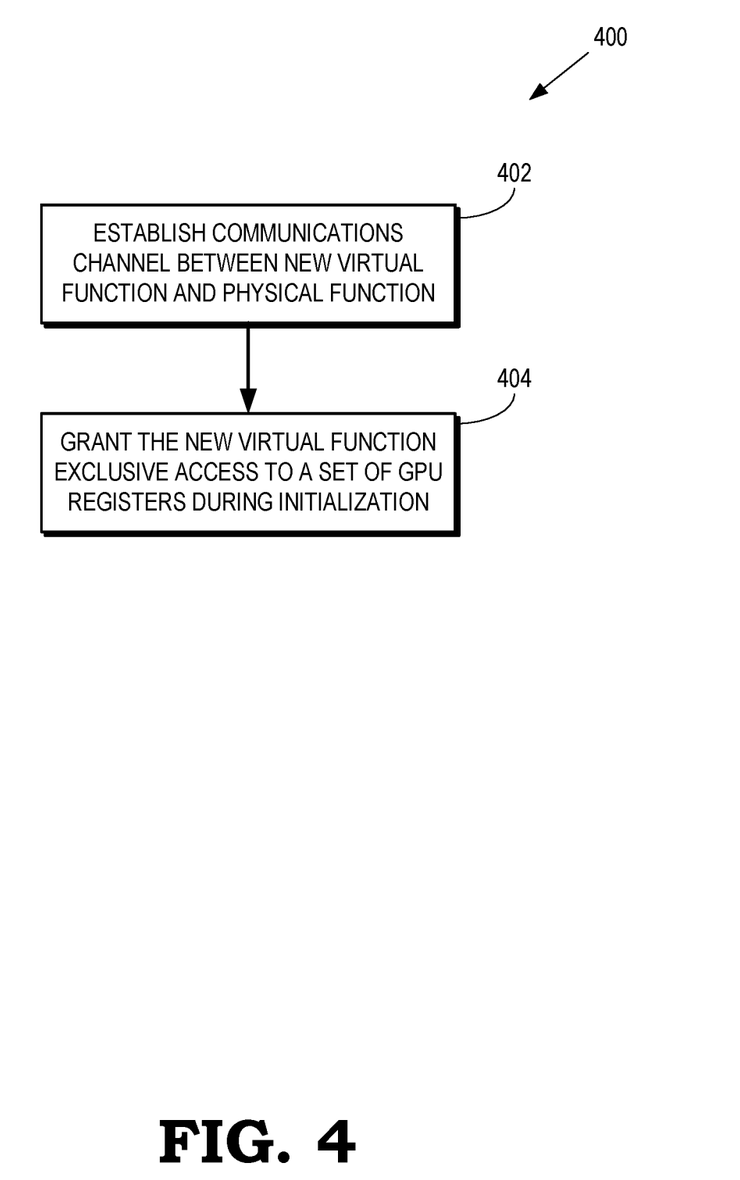
FIG. 4 is a flow diagram illustrating an example method for the granting of exclusive access to GPU registers for VF initialization in accordance with some embodiments.

FIG. 4 is a flow diagram illustrating an example method 400 for the granting of exclusive access to GPU registers for VF initialization in accordance with some embodiments.

At block 402, a communications channel is established between a virtual function of a guest virtual machine and a physical function on a graphics processing unit (GPU). In one embodiment, such as described relative to FIG. 2, the VF driver 110 of VM(N) 202 sends a request through VF(N) 214 to physical function 212 for requesting the initialization of a new virtual function (i.e., VF(N)). The controlling physical function 212 and VF(N) 214 establish a two-way communication channel that uses an acquire-release protocol to start and end VF(N)'s exclusive accesses to registers in configuration space 218.

At block 404, the VF is granted exclusive access to a set of shared GPU registers during initialization of the VF. In one embodiment, such as described relative to FIG. 2, the physical function 212 uses a clock (CLK) 222 or other similar timing control to monitor that exclusive register access by VF(N) is completed within a predetermined time period. During the exclusive access time period, permission for accessing the GPU register BAR 220 is implemented by the PF 212 suspending a VF that is currently running on the GPU 206 such that the GPU 206 is idle for allowing the initializing VF to perform its exclusive access. Exclusive access to the hardware registers allows a new virtual function to begin initialization during the pausing of other running functions. After creation, the VF is directly assigned an I/O domain. The hypervisor 208 assigns a VF 214 to a VM 202 by mapping configuration space registers of the VFs 214 to the configuration space presented to the VM by the hypervisor. In some embodiments, the physical function 212 operates as a security measure by ensuring that incoming requests from VMs 202 are well behaved. For example, if a new VF/VM starts to initialize without requesting permission, the physical function 212 or PF driver 216 disables GPU register access capabilities.

The incoming new VF (e.g., VF(N)) is only granted the predetermined time period to complete its initialization process. If the exclusive access period is time out, the controlling physical function 212 terminates the VF such as to prevent prolonged GPU stalls. For example, the PF 212 or PF driver 216 terminates the exclusive access by resetting the VF, such as by issuing a function-level reset (FLR) command.

In some alternative embodiments, such as described relative to FIG. 3, additional methods include the guest OS of the VMs 302 calling into the VF drivers 310 to query the latest fence instructions before starting a timeout detection and recovery (TDR) cycle. When the system 300 is initializing new virtual functions and one or more of the already initialized VFs 314 have pending fence instructions where the identification (ID) of the last submitted fence does not match its last completed fence instruction, the VF drivers 310 will delay the reporting of the last completed fence instruction to the guest OS before TDR to see whether the accumulated commands within command buffers 320 will be executed after the new virtual functions have finished initializing. If the VFs are allocated GPU time slices and finishes executing accumulated commands such that the ID of the last submitted fence instruction matches its last completed fence instruction, then an unnecessary TDR cycle will have been avoided for that VF. However, if the additional time period is up and the ID of the last submitted fence instruction still does not match its last completed fence instruction, then the GPU 306 and/or VF 314 is considered as hung, and the VF driver 310 will properly initiate a TDR cycle to reset the VF.

Alternatively, the VFs 314 are improperly identified as being hung even with additional time periods allocated before TDR if the system 300 has more than one new VF to be initialized. The guest OS of VMs 302 will eventually trigger TDR cycles if the VF drivers 310 cannot process accumulated commands before allocated time periods run out. Unnecessary TDR cycles are avoided by giving the already initialized VFs GPU time to perform its computing tasks. For example, after a new virtual function finishes initializing, the GPU scheduler 318 triggers world switches between all already active VFs 314 which have already finished initialization such that each VF 314 is allocated GPU time to handle any accumulated commands before reporting the last completed fence instruction ID back to the guest OS. During the world switches, the hypervisor 308 uses PF configuration space registers to switch the GPU from one VF (e.g., VF(1)) to another (e.g., VF(2)).

In some embodiments, certain aspects of the techniques described above may implemented by one or more processors of a processing system executing software. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   establishing a communications channel between a new virtual function (VF) of a guest virtual machine (VM) and a physical function (PF) on a graphics processing unit (GPU);
   granting the VF exclusive access to a set of shared GPU registers during initialization of the new VF;
   performing a world switch, after initialization of the new VF, from the new VF to a previously initialized VF executing at the GPU prior to initialization of the new VF; and
   allocating cycles of GPU processing time to the previously initialized VF to process accumulated commands.

2. The method of claim 1, further comprising:
   transmitting a request from a VF driver of the VM to the PF for requesting initialization of the VF.

3. The method of claim 1, wherein the communications channel uses an acquire-release protocol to start and end exclusive access to the set of shared GPU registers.

4. The method of claim 1, wherein the cycles of GPU processing time are allocated to the previously initialized VF before further initializing a second new VF.

5. The method of claim 1, further comprising:
   querying a latest completed fence instruction and comparing the latest completed fence instruction against a latest submitted fence instruction to determine if the previously initialized VF has become hung.

6. The method of claim 1, further comprising:
   assigning an additional wait time to the previously initialized VF for processing accumulated commands before triggering a timeout discovery and recovery (TDR) cycle.

7. The method of claim 1, wherein granting the new VF exclusive access to a set of shared GPU registers comprises opening a base address range of the shared GPU registers during the exclusive access.

8. A system, comprising:
   a server to host a plurality of guest virtual machines (VMs), wherein the server comprises a physical device with resources allocated to the plurality of guest VMs, and further wherein a virtual function (VF) associated with the physical device is configured for each of the plurality of guest VMs; and
   a set of shared registers in the physical device, wherein exclusive access to the set of shared registers is granted to a new VF during an initialization process of the new VF, and further wherein a world switch is triggered, after initialization of the new VF, from the new VF to a previously initialized VF executing at the physical device prior to initialization of the new VF, and further wherein GPU time is allocated to the previously initialized VF for processing accumulated commands.

9. The system of claim 8, wherein the physical device comprises a graphics processing unit (GPU) with a set of shared GPU registers.

10. The system of claim 8, wherein the set of shared registers comprises a base address range that is opened to allow direct pass through from the new VF to the set of shared registers.

11. The system of claim 8, wherein the previously initialized virtual function (VF) includes a command buffer for accumulating commands during initialization of new virtual functions.

12. The system of claim 11, wherein the command buffer is queried to compare a latest completed fence instruction against a latest submitted fence instruction for determining if the previously initialized VF has become hung.

13. The system of claim 12, wherein an additional wait time is assigned to the previously initialized VF for processing accumulated commands before triggering a timeout discovery and recovery (TDR) cycle.

14. The system of claim 8, wherein GPU time is allocated to the previously initialized VF before further initializing a second new VF.

15. A non-transitory computer readable medium embodying a set of executable instructions, the set of executable instructions to manipulate a processor to:
   establish a communications channel between a new virtual function (VF) of a guest virtual machine (VM) and a physical function (PF) on a graphics processing unit (GPU);
   grant the new VF exclusive access to a set of shared GPU registers during initialization of the new VF;
   perform a world switch, after initialization of the new VF, from the new VF to a previously initialized VF executing at the GPU prior to initialization of the new VF; and
   allocate GPU time to the previously initialized VF to process accumulated commands.

16. The non-transitory computer readable medium of claim 15, wherein the processor is to:
   query a latest completed fence instruction and comparing the latest completed fence instruction against a latest submitted fence instruction to determine if the previously initialized VF has become hung.

17. The non-transitory computer readable medium of claim 16, wherein the processor is to:
   allocate GPU time to the previously initialized VF before further initializing a second new VF.

* * * * *